(12) United States Patent
Kazakov et al.

(10) Patent No.: US 7,823,120 B2
(45) Date of Patent: Oct. 26, 2010

(54) DEVICE, SYSTEM AND METHOD FOR ACCELERATED MODELING

(75) Inventors: Evgeny Kazakov, Naale (IL); Michael Kazakov, Jerusalem (IL); Eran Peleg, Kfar Vradim (IL)

(73) Assignee: Metaphor Vision Ltd., Jerusalem (IL)

( * ) Notice: Subject to any disclaimer, the term of this patent is extended or adjusted under 35 U.S.C. 154(b) by 1002 days.

(21) Appl. No.: 10/591,317

(22) PCT Filed: Mar. 2, 2005

(86) PCT No.: PCT/IL2005/000243

§ 371 (c)(1),
(2), (4) Date: Aug. 31, 2006

(87) PCT Pub. No.: WO2005/084124

PCT Pub. Date: Sep. 15, 2005

(65) Prior Publication Data

US 2007/0180424 A1 Aug. 2, 2007

Related U.S. Application Data

(60) Provisional application No. 60/548,879, filed on Mar. 2, 2004.

(51) Int. Cl.
*G06F 9/44* (2006.01)
(52) U.S. Cl. ...................... 717/104; 717/120
(58) Field of Classification Search ............... 717/104, 717/120
See application file for complete search history.

(56) References Cited

U.S. PATENT DOCUMENTS

| | | | | |
|---|---|---|---|---|
| 5,101,491 A | * | 3/1992 | Katzeff | 703/22 |
| 5,748,961 A | * | 5/1998 | Hanna et al. | 717/145 |
| 6,243,696 B1 | | 6/2001 | Keeler et al. | |
| 6,269,473 B1 | * | 7/2001 | Freed et al. | 717/104 |
| 6,438,744 B2 | * | 8/2002 | Toutonghi et al. | 717/137 |
| 6,496,870 B1 | * | 12/2002 | Faustini | 719/316 |
| 6,789,054 B1 | * | 9/2004 | Makhlouf | 703/6 |
| 7,493,630 B2 | * | 2/2009 | Hunt | 719/330 |
| 7,568,019 B1 | * | 7/2009 | Bhargava et al. | 709/223 |
| 7,627,861 B2 | * | 12/2009 | Smith et al. | 717/144 |
| 2001/0045963 A1 | * | 11/2001 | Marcos et al. | 345/765 |
| 2002/0118220 A1 | * | 8/2002 | Lui et al. | 345/709 |
| 2002/0178290 A1 | * | 11/2002 | Coulthard et al. | 709/246 |
| 2003/0074648 A1 | | 4/2003 | Brassard et al. | |
| 2004/0031015 A1 | * | 2/2004 | Ben-Romdhane et al. | 717/107 |
| 2004/0260528 A1 | * | 12/2004 | Ballagh et al. | 703/14 |

(Continued)

OTHER PUBLICATIONS

Grady Booch et al., "The Unified Modeling Language for Object-Oriented Development", Aug. 6, 1996, Rational Software Corporation, pp. 1-30.*

(Continued)

*Primary Examiner*—Wei Y Zhen
*Assistant Examiner*—Chih-Ching Chow
(74) *Attorney, Agent, or Firm*—Pearl Cohen Zedek Latzer, LLP

(57) ABSTRACT

Briefly, embodiments of the invention provide, for example, devices, systems and methods for accelerated modeling. A method may include, for example, defining a domain-specific language (100) usable in a modeling environment (700) and having a dynamic component and a static component, the dynamic component able to affect a behavior of the static component.

39 Claims, 10 Drawing Sheets

U.S. PATENT DOCUMENTS

2005/0097146 A1* 5/2005 Konstantinou et al. ...... 707/200

OTHER PUBLICATIONS

Pfahler et al., Configuring Component-based Specifications for Domain-Specific Languages, HICSS, Jan. 2001, vol. 09, No. 9.

Kleppe et al., MDA Explained, The Model Driven Architecture: Practice and Promise, Addison-Wesley, May 2003, Chapters 3,11 and 12.

Fowler, DomainSpecificLanguage, Feb. 13, 2004, accessed and printed online at <http://martinfowler.com/bliki/DomainSpecificLanguage.html>.

Van Deursen et al., Domain-Specific languages: an annotated bibliography, ACM SIGPLAN Notices, Jun. 2000, vol. 35, Issue 6, pp. 26-36.

Mernick et al., Domain-Specific languages for software engineering, HICSS, Jan. 2001, vol. 09, No. 9.

Thomas et al., Model driven development: the case for domain oriented programming, OOPSLA '03, Oct. 2003, pp. 2-7.

Greenfield et al., Software factories: assembling applications with patterns, models, frameworks and tools, OOPSLA '03, Oct. 2003, pp. 16-27.

Fowler, Languages Workbenches: The Killer-App for Domain Specific Languages?, accessed and printed online at <http://martinfowler.com/articles/IanguageWorkbench.html>, Jun. 12, 2005.

International Search Report of Application PCT/IL05/00243 Issued on Oct. 27, 2005.

Gabor Karsai et al: "Model-Integrated Development of Embedded Software" Proceedings of the IEEE, IEEE. New York, US, vol. 91, No. 1, Jan. 1, 2003, XP011065100 ISSN: 018-9219.

Steven Kelly et al: "Metaedit+: A Fully Configurable Multi-User and Multi-tool Case and Came environment" Proceedings o the $8^{th}$ International Conference on Advanced Information Systems, Caise 96, Springer, no. Chapter 3, Jan. 1, 1996, pp. 113-137, XP007913029.

Steven Kelly et al: Visual domain-specific modeling: Benefits and experiences of using metaCase tools: International Workshop on Model Engineering, Ecoop 2000, Jan. 1, 2000, pp. 1-9, XP007913006.

Akos Ledeczi et al: "The Generic Modling Environment" Proceedings of WISP' 2001, May 2001 in Budapest, Hungary, IEEE, US, May 1, 2001.

* cited by examiner

DEVICE, SYSTEM AND METHOD FOR ACCELERATED MODELING

PRIOR APPLICATIONS DATA

This application is a National Phase Application of PCT International Application Number PCT/IL2005/000243, entitled "Device, System and Method for Accelerated Modeling". International Filing Date Mar. 2. 2005, published on Sep. 15. 2005 as International Publication Number WO 2005/084124; which in turn claims benefit and priority from United States Provisional Patent Application Number 60/548,879, entitled "Device, System and Method for Accelerated Modeling", filed on Mar. 2, 2004, both of which are incorporated herein by reference in their entirety.

FIELD OF THE INVENTION

This application relates generally to the field of Information Technology (IT) and, more particularly, to IT modeling systems.

BACKGROUND OF THE INVENTION

In the field of Information Technology (IT), a model-driven approach and related technologies are used to deliver agile and robust reusable assets. The model-driven approach is supported by various standardization processes offered by several organizations, for example, the World Wide Web Consortium (W3C) (<www.W3.org>) and the Object Management Group, Inc. (OMG) (<www.OMG.org>). Existing standardization processes include, for example, Unified Modeling Language (UML), Meta-Object Facility (MOF), Common Warehouse Metamodel (CWM), and Model Driven Architecture (MDA), and are supported by various software development suites.

Model-driven standards reflect common industry terms to ensure a unified modeling foundation for substantially all participating organizations, and thus serve as a basis for a unifying methodology and for business-to-business interoperability. However, a business entity may also have its own domain-specific language to be used, for example, in operational activities and in supporting technology infrastructure. Therefore, a modeling language (for example, UML) may be overly generic and abstract and may not be efficiently used in many domain-specific areas.

SUMMARY OF THE INVENTION

Some embodiments of the invention allow, for example, alignment of universal and business-specific aspects through a modeling phase of a development process, as well as aspect-oriented programming through models.

Some embodiments of the invention allow, for example, adoption and customization of common modeling languages and modeling tools to create a capacity to answer specific business requirements in appropriate terms and at an appropriate level of abstraction.

Some embodiments of the invention provide, for example, a builder suite that allows creation and usage of customized Unified Modeling Language (UML) providing a Domain Specific Language (DSL) on top of existing modeling standards and tools. This may provide, for example, flexible meta-model-driven solutions for an entire Information Technology (IT) development process, e.g., from definition of requirements to deployment and operation.

In some embodiments, the builder suite may, for example, generate domain-specific profiles for UML tools, which then control and guide the development process, thereby providing automatic generation of tangible artifacts from high-level technology independent models, as well as automatic creation of metadata databases storing or holding the generated assets in terms of a customized language. In some embodiments, the builder suite may, for example, provide an enterprise with an effective enabler and accelerator of industry adopted standards, existing tools, and cost-saving automation approaches.

In some embodiments, the builder suite may allow language customization to be flexible, agile, and compatible with existing standards and modeling tools. The builder suite according to some embodiments of the invention may be adapted to the needs and capabilities of users, e.g., programmers as well as non-programmers. The customization may provide reuse capabilities and further specialization of DSL resources. The builder suite may allow, for example, implementing a declarative, flexible, and agile process of UML customization or modification without using code (i.e., a "zero code" process).

In some embodiments, the builder suite may include, for example, a modeling accelerator based on concepts of the Model-Driven Architecture (MDA) standard.

Some embodiments of the invention may comply with modeling standards, and/or may operate as one or more additional layers on top of an existing modeling tool.

In some embodiments, the builder suite may allow modelers to define their own DSL (including, for example, a banking-oriented DSL, a DSL for Capability Maturity Model Integration (CMMI), a DSL for component architecture, or the like) and to apply it during the modeling process and/or during an automatic application generation process.

In some embodiments, the builder suite may operate a MDA-compliant or MDA-compatible lightweight customization of the modeling language, e.g., a customization which may not change definitions of the underlying language, namely, UML. In one embodiment, in order to express substantially all required domain-specific terms and rules, the builder suite may use only, or at least, the accepted standard language notations, e.g., in accordance with UML and/or Object Constraint Language (OCL). In some embodiments, the builder suite may provide and manage interoperability between existing modeling tools and the MDA-compliant or MDA-compatible generating tools that utilize results of the modeling process.

In some embodiments, the builder suite may include multiple high-level components, for example, a language builder component, a language runtime component, and a language metadata database component. These components may utilize a set of universal, metadata-driven components of a framework, for example, a properties inspector component, a configuration manager component, a validation manager component, a process mentor component, a constraints parser component, a generator component, a documenter component, or other components or modules.

In some embodiments, the builder suite may treat a DSL as a composite entity, able to encapsulate other existing languages and/or able to be encapsulated.

In some embodiments, a set of language definitions may include, for example, domain data types, aspects and terms, as well as properties of the domain aspects and terms, and relationships among the terms; domain-specific operations, constraints, and behavioral patterns; definitions of recommended modeling processes; rules of model validation, transformation, querying; and other components or modules.

Some embodiments may allow, for example, automatic generation of testing artifacts based on domain-specific terms and behavioral patterns; automatic model construction based on external definitions represented as an extensible Markup Language (XML) file; automatic generation of an XML file based on the pre-defined DSL and model elements; creating application configuration from model specifications; and/or providing application management features based on a specific management DSL.

In some embodiments, a method may include, for example, defining a domain-specific language usable in a modeling environment and having a dynamic component and a static component, the dynamic component able to affect a behavior of the static component.

The method may include, for example, defining the dynamic component and the static component in accordance with UML constructs and semantics.

The method may include, for example, defining a customized UML meta-modeling profile which supports definitions of the dynamic component and the static component.

The method may include, for example, defining the domain-specific language based on custom meta-modeling constructs, the constructs in accordance with a UML meta-modeling profile and defining the dynamic component and the static component.

The method may include, for example, importing a definition of an element of the domain-specific language from a previously-defined domain-specific language.

The method may include, for example, validating the domain-specific language in accordance with a validation rule defined in a meta-modeling language.

The method may include, for example, generating an XML output representing at least one definition of the domain-specific language.

The method may include, for example, defining a custom action available for execution, on an element of an application model compliant with the domain-specific language, in response to an invocation request in accordance with the domain-specific language.

The method may include, for example, defining at least one language information item of the domain-specific language; defining at least one language term of the domain-specific language; and defining at least one data type of the domain-specific language.

The method may include, for example, defining a relationship between the at least one language term and another language term of the domain-specific language.

The method may include, for example, defining a constraint associated with one or more elements of the domain-specific language to be used during validation of the one or more elements of the domain-specific language.

The method may include, for example, defining an aspect able to affect an element selected from a group consisting of: the at least one language term, a property of the at least one language term, and a relationship between the at least one language term and another language term.

The method may include, for example, applying the domain-specific language to the model during execution of a modeling process.

The method may include, for example, creating one or more elements of a model in accordance with terms defined in the domain-specific language.

The method may include, for example, generating a recommended modeling route to be used during creation of the one or more elements of the model in accordance with a mentor modeling definition of the domain-specific language.

The method may include, for example, executing a custom action defined in the domain-specific language on at least one of said one or more elements of the model.

The method may include, for example, converting a domain-specific model artifact of the domain-specific language into an application artifact usable during execution of the modeling process.

The method may include, for example, storing the domain-specific model artifact in a metadata database able to provide access to the domain-specific model artifact.

In some embodiments, a system for accelerated modeling may include, for example, a language builder module to define a domain-specific language usable in a modeling environment and having a dynamic component and a static component, the dynamic component able to affect a behavior of the static component.

In some embodiments, for example, the language builder module may be able to import a definition of an element of the domain-specific language from a previously-defined domain-specific language.

In some embodiments, for example, the language builder module may include a validator to validate the domain-specific language in accordance with a validation rule defined in a meta-modeling language.

In some embodiments, for example, the language runtime module may include an action executor to execute a custom action defined in the domain-specific language on at least one of said one or more elements of the model.

In some embodiments, for example, the language runtime module may include a process mentor module to guide the runtime process in accordance with a process definition of the domain-specific language.

In some embodiments, for example, the language builder module may include a generator to generate an extensible Markup Language output representing at least one definition of the domain-specific language.

In some embodiments, for example, the language builder module may include an action editor to define a custom action available for execution on a model in accordance with the domain-specific language in response to an invocation request in accordance with the domain-specific language.

In some embodiments, for example, the language builder module may be able to define at least one language information item of the domain-specific language, to define at least one language term of the domain-specific language, and to define at least one data type of the domain-specific language.

In some embodiments, for example, the language builder module may be able to define a relationship between the at least one language term and another language term of the domain-specific language.

In some embodiments, for example, the language builder module may include a constraint editor to define a constraint to be used during validation of one or more elements of the domain-specific language.

In some embodiments, for example, the system may include a mentoring module to generate a recommended modeling route available during creation of one or more elements of a model in accordance with a mentor modeling definition of the domain-specific language.

In some embodiments, for example, the system may include a generator able to create one or more elements of a model in accordance with a process defined in the domain-specific language.

In some embodiments, for example, the system may include a language runtime module to apply the domain-specific language to the model during execution of a runtime process of the model.

In some embodiments, for example, the language runtime module may include a validator to validate the model based on a validation rule defined in the domain-specific language.

In some embodiments, for example, the language runtime module may include a generator to generate an eXtensible Markup Language output representing the model based on the domain-specific language.

In some embodiments, for example, the system may include a converter to convert a domain-specific model artifact based on the domain-specific language into an application artifact usable during execution of the runtime process.

In some embodiments, for example, the system may include a database to store the domain-specific model artifact and to provide access to the domain-specific model artifact during execution of the runtime process.

Embodiments of the invention may allow various other benefits, and may be used in conjunction with various other applications.

BRIEF DESCRIPTION OF THE DRAWINGS

The present invention will be understood and appreciated more fully from the following detailed description taken in conjunction with the drawings in which.

Figure 1:
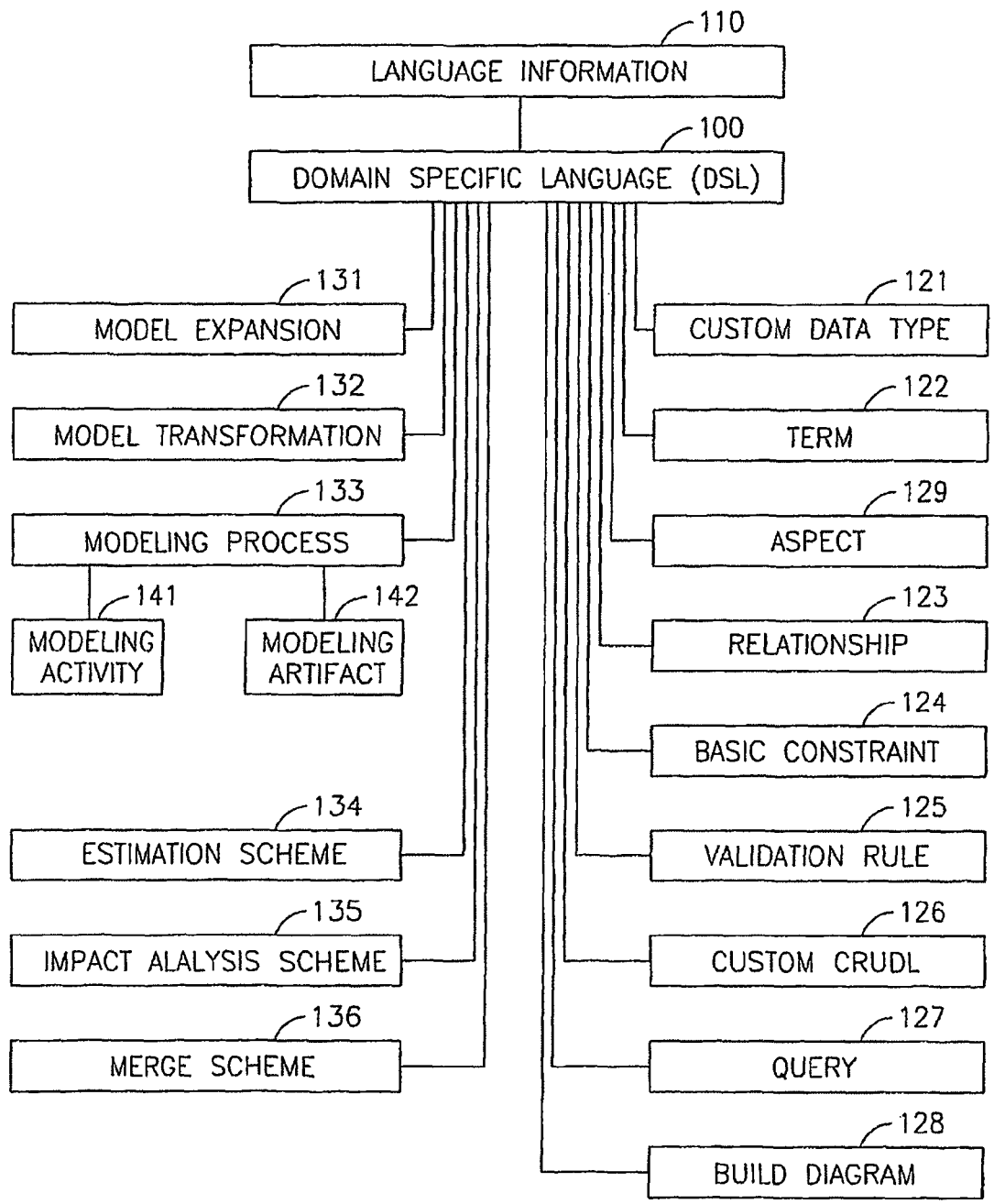
FIG. 1 is a block diagram illustration of a conceptual representation of a Domain-Specific Language (DSL) in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Although part of the discussion herein may relate, for exemplary purposes, to UML-based modeling or models, embodiments of the invention are not limited in this regard, and may be used in conjunction with various other suitable types of models, modeling, modeling languages, modeling environments, or modeling tools.

The term "domain" as used herein may include, for example, any suitable field or subject-matter. For example, a "domain" may include a relatively broad area or set of areas (e.g., banking applications, manufacturing applications, JAVA™ technology applications, JAVA™ 2 Platform Enterprise Edition (J2EE) technology applications, or the like), a relatively narrow area or aspect (e.g., minimum element information, for example, names in a different language, dates, creators, description, or the like), or set of areas or aspects (e.g., security aspects of an application, component-based development (CBD), an arithmetic area such as matrix processing, or the like).

FIG. 1 schematically illustrates a block diagram of a conceptual representation of a Domain-Specific Language (DSL) 100 in accordance with some embodiments of the invention. DSL 100 may include, or may be associated with or based on, for example, language information 110, one or more static (e.g., structural) components, and one or more dynamic (e.g., behavioral) components. The static components may include, for example, a custom data type component 121, a term component 122, an aspect component 129, a relationship component 123, a basic constraint component 124, a validation rule component 125, or the like. The static components of the DSL 100 may be used, for example, as building-blocks in creating a model customized to accommodate the DSL 100.

The dynamic components may include, for example, a custom Create Read Update Delete List (CRUDL) component 126, a query component 127, a build diagram component 128, a model expansion component 131, a model transformation scheme component 132, a modeling process component 133 (e.g., associated with a modeling activity component 141 and a modeling artifact component 142), an estimation scheme component 134, an impact analysis scheme component 135, a merge scheme component 136, or the like. The dynamic components of the DSL 100 may provide behavioral support to the static components and to a model under construction. For example, a static component (e.g., the term component 122, the relationship component 123, or the like) may be affected and modified by a dynamic component (e.g., the model expansion component 131, the modeling process component 133, or the like). In some embodiments, DSL definitions may belong to one of several (e.g., two or three) groups. For example, a first group of DSL definitions may include static components, e.g., terms, aspects, data-types, relationships, constraints, or the like; a second group of DSL definitions may include dynamic components, e.g., actions of substantially all types, behaviors of static components, or the like; and a third group of DSL definitions may include processes, e.g., dynamic processes, recommended flows or behaviors of static components, or the like.

Figure 2:
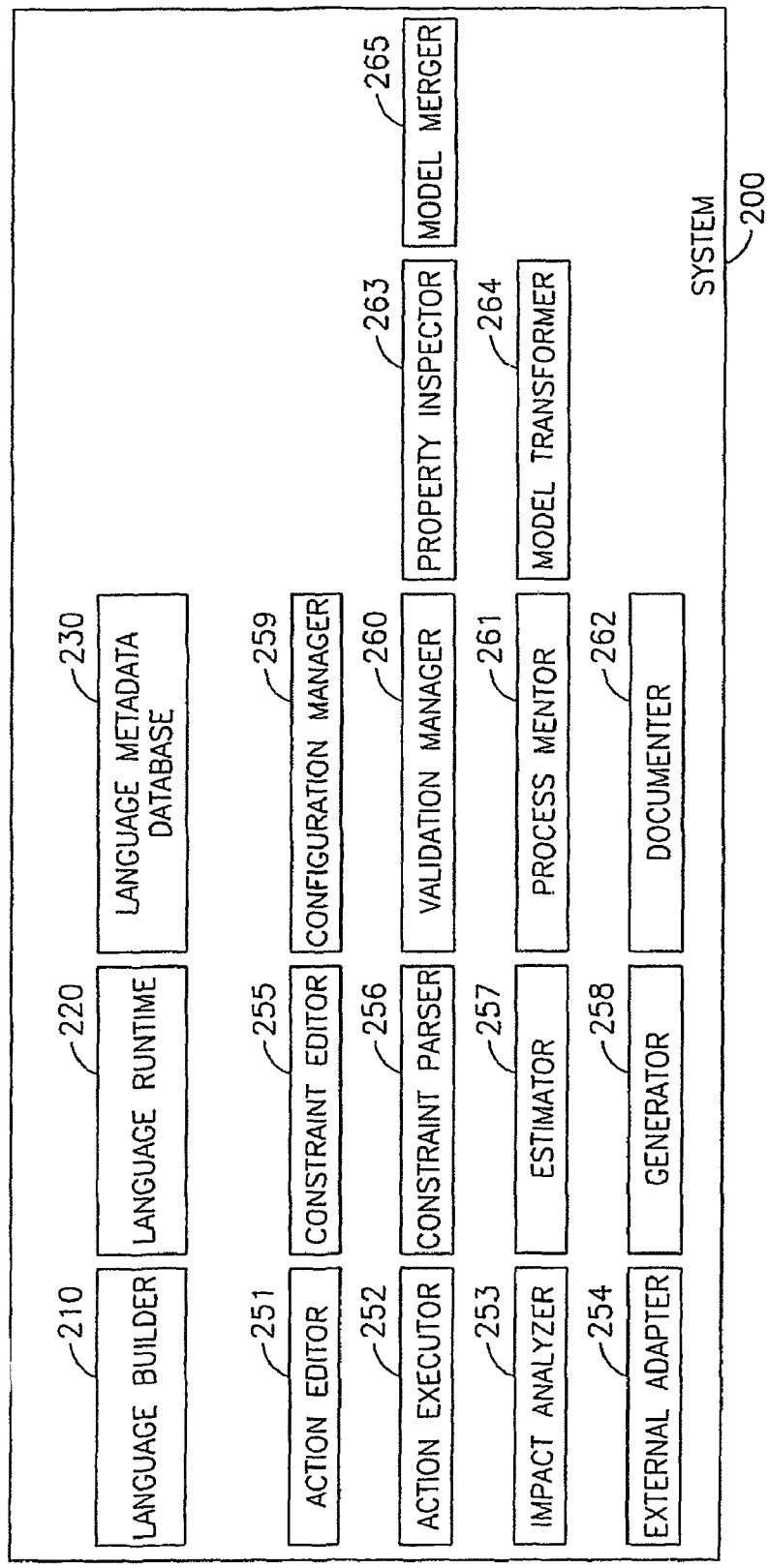
FIG. 2 is a schematic block diagram illustration of a system for accelerated modeling in accordance with an embodiment of the invention.

FIG. 2 schematically illustrates a block diagram of a system 200 for accelerated modeling in accordance with some embodiments of the invention. System 200 may include one or more components or modules, for example, a language builder 210, a language runtime 220, and a language metadata database 230. In some embodiments, system 200 may be implemented as a framework for accelerated modeling, e.g., a container of reusable components or other artifacts, optionally associated with an environment for using such components. Language builder 210, language runtime 220, and/or language metadata database 230 may include, contain, use or reuse one or more component or modules 251-265, for example, an action editor 251, an action executor 252, an impact analyzer 253, an external adapter 254, a constraint editor 255, a constraint parser 256, an estimator 257, a generator 258, a configuration manager 259, a validation manager 260, a process mentor 261, a documenter 262, a property inspector 263, a model transformer 264, and/or a model merger 265.

Action editor 251 may include, for example, a universal, metadata driven component able to support definitions of actions, or items of additional functionality described in the terms of a DSL. Actions may be available during modeling time via extended menus and may allow a modeler, for example, to perform customized CRUDL operations of model elements, to query the model and to obtain on-line reports, and to create views as pre-defined UML diagrams. An action definition may include, for example, an action type (e.g., a "what" parameter), an initial language term (e.g., a "from" parameter), resulting language terms (e.g., one or more "to" parameters), optional filtering criteria, and specification of one or more outputs.

Action executor 252 may include, for example, a universal, metadata driven component able to provide a custom actions menu and able to execute actions as defined in the language. Actions executed by action executor 252 may include, for example, customized CRUDL operations, querying of entities according to pre-defined criteria, referencing of relationships and reporting of linked entities, and automatic diagram building.

Impact analyzer 253 may include, for example, a universal model driven generator able to perform automatic impact analysis on the model under construction. The impact analyzer 253 may operate, for example, based on an impact analysis scheme which may be a part of the DSL (e.g., impact analysis scheme 135 of FIG. 1).

External adapter 254 may include a universal, metadata driven component which may integrate system 200 with an external MDA-compliant generator, for example, by automatically providing to the MDA-compliant generator data corresponding to language specification and/or language mapping. External adapter 254 may automatically provide to the external generator one or more items as input, for example, definitions of architecturally significant parts of the language (e.g., specification), and a marked model, i.e., a model having tagged values responsible for further mapping (e.g., mapping). Based on these inputs, the external generator may focus on the generation process, based on the marked UML model. In some embodiments, the generation process may result in one or more types of tangible artifacts, for example, codes, scripts, help files, installed procedures, or the likes.

Constraint editor 255 may include, for example, a universal, metadata driven component able to generate and edit definitions of constraints for substantially all entities of the DSL under construction ("language constraints") and for the model elements themselves ("model constraints"). In some embodiments, language constraints may populate once-defined regulations for substantially all models which use the language, whereas model constraints may be used to refine existing regulations for a particular model element. In some embodiments, constraint editor 255 may allow constraint definitions for substantially all types of language entities, for example, data types, terms, relationships, transformation schemas, process definitions, or the like. Constraint editor 255 may support definitions, for example, in terms of the custom DSL itself, and may automatically translate definitions into a standard Object Constraint Language (OCL) form which may refer to UML's meta model.

Constraint parser 256 may include, for example, a universal, metadata driven component able to parse OCL expressions defining domain-specific rules and regulations.

Estimator 257 may include, for example, a universal model-driven generator able to perform automatic estimations of costs, resources and risks. Estimator 257 may utilize an estimation scheme, for example, estimation scheme 134 of FIG. 1, or other estimation scheme which may be an included part of the DSL.

Generator 258 may include, for example, a universal, metadata driven component able to perform a MDA-compliant generation process, e.g., automatic building of tangible artifacts from model entities. Generator 258 may support a transition from language definition to language supported modeling, for example, by generating eXtensible Markup Language (XML) definitions from the DSL meta-model, generating DSL-related profile installation scripts for a pre-defined set of generic modeling tools, generating code, generating deployment descriptors, generating process-flow and workflow descriptors, generating metadata database and database tables, and/or generating initialization and upgrade Data Definition Language (DDL) scripts for a Meta-Object Facility (MOF) compliant repository.

Configuration manager 259 may include, for example, a component able to perform activation of the runtime environment, e.g., by loading of language definitions and setting of preferences.

Validation manager 260 may include, for example, a universal, metamodel driven component or validator able to evaluate constraints definitions as defined in the DSL, e.g., to ensure the model's validity. Validation manager 260 may provide, for example, online reporting of inconsistencies, warning messages and error messages which may reference invalid elements. Validation manager 260 may perform validation in accordance with one or more aspects, for example, a first aspect of meta-model level validation or DSL level validation, a second aspect of model level validation (e.g., according to validation rules defined in the DSL), or the like.

Process mentor 261 may include, for example, a universal, metadata driven component able to incarnate modeling flow definitions, as defined in the DSL, at modeling time. The process mentor 261 may provide a user (e.g., a modeler) with, for example, step-by-step wizards, next activity prompts, estimation of modeling progress, phase-sensitive helps, methodology guiding, or other functions in accordance with a process definition within the available DSL or DSLs.

Documenter 262 may include, for example, a universal model driven generator able to perform automatic creation of documents reflecting the model content and status with respect to one or more selected DSLs, e.g., reports, proposals, specifications, or other documents.

Property inspector 263 may include, for example, a universal, metadata driven component able to allow viewing and editing of extended model elements' properties, e.g., in accordance with definitions made in the DSL.

Model transformer 264 may include, for example, a universal, metadata driven component able to perform intra-model transformations and/or model-to-model transformations. For example, model transformer 264 may perform automatic model expanding based on language rules and defaults, and automatic model-to-model transformations based on transformation schemas (e.g., model transformation scheme 132 of FIG. 1, or other transformation schemas which may be part of the DSL definitions). In some embodiments, model transformer 264 may perform transformations of a model into one or more representations, for example, an XML file, a JAVA™ interface, C-sharp (C#), Distributed Component Object Model (DCOM), or the like. In one embodiment, model transformer 264 may perform transformations from a first DSL to a second DSL.

Model merger 265 may include, for example, a universal, metadata driven component able to merge models, and/or able to upgrade a model (e.g., if changes occurred in the modeling language). Model merger 265 may utilize a merge scheme which may be part of the DSL, for example, merge scheme 136 of FIG. 1.

In some embodiments, the language runtime 220 may include a MDA-compliant modeling accessory able to apply a DSL (e.g., vocabulary and/or behavior of a DSL) at modeling time.

The language runtime 220 may be implemented, for example, as an add-in to a modeling tool. The language runtime 220 may extend the modeling tool functionality by interpretation of additional information (e.g., provided by the DSL definitions), to allow, for example, viewing and editing of domain-specific properties, execution of custom actions, semantic model validation, impact analysis and reporting, mergers and upgrades, model-to-model transformations, automatic model-driven estimations of costs, risks, and resources, modeling process mentoring, exchange with the metadata database, integration with MDA generation tools, or the like.

In some embodiments, the language metadata database 230 may include, for example, a MDA-compliant metadata repository which may provide persistence to domain-specific meta-models and/or models. The language metadata database 230 may map meta-models to relational tables, and may be implemented, for example, using a Structured Query Language (SQL) database server or other suitable database formats or data storage formats. The language metadata database 230 may provide, for example, MOF-compliant interfaces to stored entities. In order to support a DSL or a model without a-priori knowledge about their structure, the language metadata database 230 may implement MOF reflective interfaces, e.g., a set of generic interfaces based on common UML terms and allowing step-by-step self-explanation of metadata at runtime. In some embodiments, the language metadata database 230 may support data maintenance functionality for stored metadata entries, as well as XML Metadata Interchange (XMI) import and export functions, and may store model information in XMI format. In some embodiments, the language metadata database 230 may store model elements, including substantially all their UML and DSL specific information.

In some embodiments, the language metadata database 230 may include, for example, an import/export module or component able to perform XMI exchange operations, and a Business Objects (BO) module or component able to provide persistence functionality.

Figure 3:
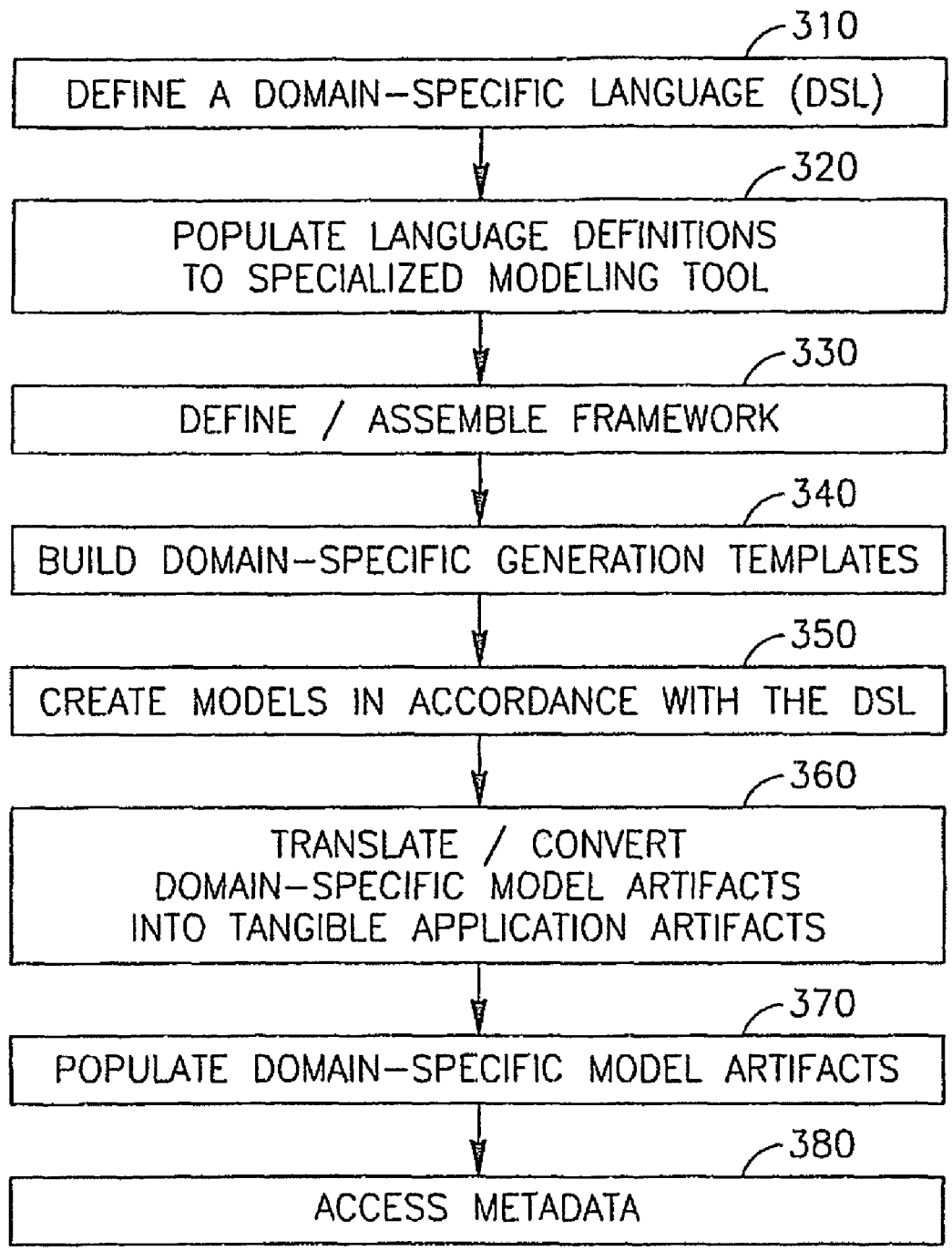
FIG. 3 is a schematic flow-chart of a method of accelerated modeling in accordance with some embodiments of the invention.

FIG. 3 is a schematic flow-chart of a method of accelerated modeling in accordance with some embodiments of the invention. In some embodiments, the method may allow and support a MDA-compliant process of model-driven development, from initial requirements through an operational solution, for example, based on defining and utilizing of domain-specific modeling language which expresses domain-specific terms, regulations and processes, and provides an abstraction allowing to orchestrate application development. In some embodiments, the method may allow, for example, achieving quality of specialized solutions on top of generic components. The method may be used or implemented, for example, automatically or semi-automatically using one or more computing platforms, which may optionally be operated by one or more users (e.g., a methodologist, an architect, a modeler, or the like).

As indicated at box 310, the method may include, for example, defining a domain-specific modeling language. This may include, for example, composing or reusing available language resources (e.g., previously defined languages) and optionally refining, expanding or modifying language definitions. The operations of box 310 may result in, for example, a DSL, e.g., a full set of language definitions able to answer organization or domain needs or objectives. In one embodiment, the operations of box 310 may be performed, for example, using a computing platform operated by a user (e.g., a methodologist).

As indicated at box 320, the method may include, for example, storing or populating language definitions (e.g., as defined by the operations of box 310) to customize a modeling tool and to organize storage for domain-specific model entities (e.g., metadata database initialization scripts). In one embodiment, the operations of box 320 may be performed, for example, using a computing platform operated by a user (e.g., a methodologist or an architect).

As indicated at box 330, the method may include, for example, defining and assembling a framework of universal metadata driven components, to be used as a foundation for a solution able to answer domain-specific needs or objectives as specified in the operations of box 310. In one embodiment, the operations of box 330 may be performed, for example, using a computing platform operated by a user (e.g., an architect).

As indicated at box 340, the method may include, for example, building domain-specific generation templates allowing automatic transformation of the models based on the DSL (e.g., as defined in the operations of box 310) into tangible application artifacts utilizing a framework (e.g., as defined in the operations of box 330). In one embodiment, the operations of box 340 may be performed, for example, using a computing platform operated by a user (e.g., an architect).

As indicated at box 350, the method may include, for example, creating models in the terms and by the process defined in the DSL (e.g., the DSL defined in the operations of box 310), using modeling tool customization (e.g., provided by the operations of box 320). In one embodiment, the operations of box 350 may be performed, for example, using a computing platform operated by a user (e.g., a modeler).

As indicated at box 360, the method may include, for example, translating or converting domain-specific model artifacts (e.g., created in the operations of box 350) into tangible application artifacts. This may be performed, for example, using domain-specific generation templates (e.g., created in the operations of box 340) and definitions of universal metadata driven components (e.g., created in the operations of box 330). In one embodiment, the operations of box 350 may be performed, for example, using a computing platform operated by a user (e.g., a modeler).

As indicated at box 370, the method may include, for example, populating domain-specific model artifacts (e.g., created in the operations of box 350) such that the artifacts may be available as metadata database (e.g., using the database initialized in the operations of box 320). In one embodiment, the operations of box 350 may be performed, for example, using a computing platform operated by a user (e.g., a modeler).

As indicated at box 380, an operational application (e.g., resulting from the operations of box 360) using generation templates (e.g., as defined in the operations of box 340) and utilizing universal metadata driven components (e.g., as defined in the operations of box 330) may access metadata (e.g., as created or stored in the operations of box 370) located in the metadata database (e.g., the database initialized in the operations of box 320) which may represent model elements (e.g., created in the operations of box 350) using a customized modeling environment (e.g., as provided by the operations of box 320), in accordance with the terms and process of the DSL (e.g., defined in the operations of box 310).

Other suitable operations or sets of operations may be used in accordance with embodiments of the invention.

Figure 4:
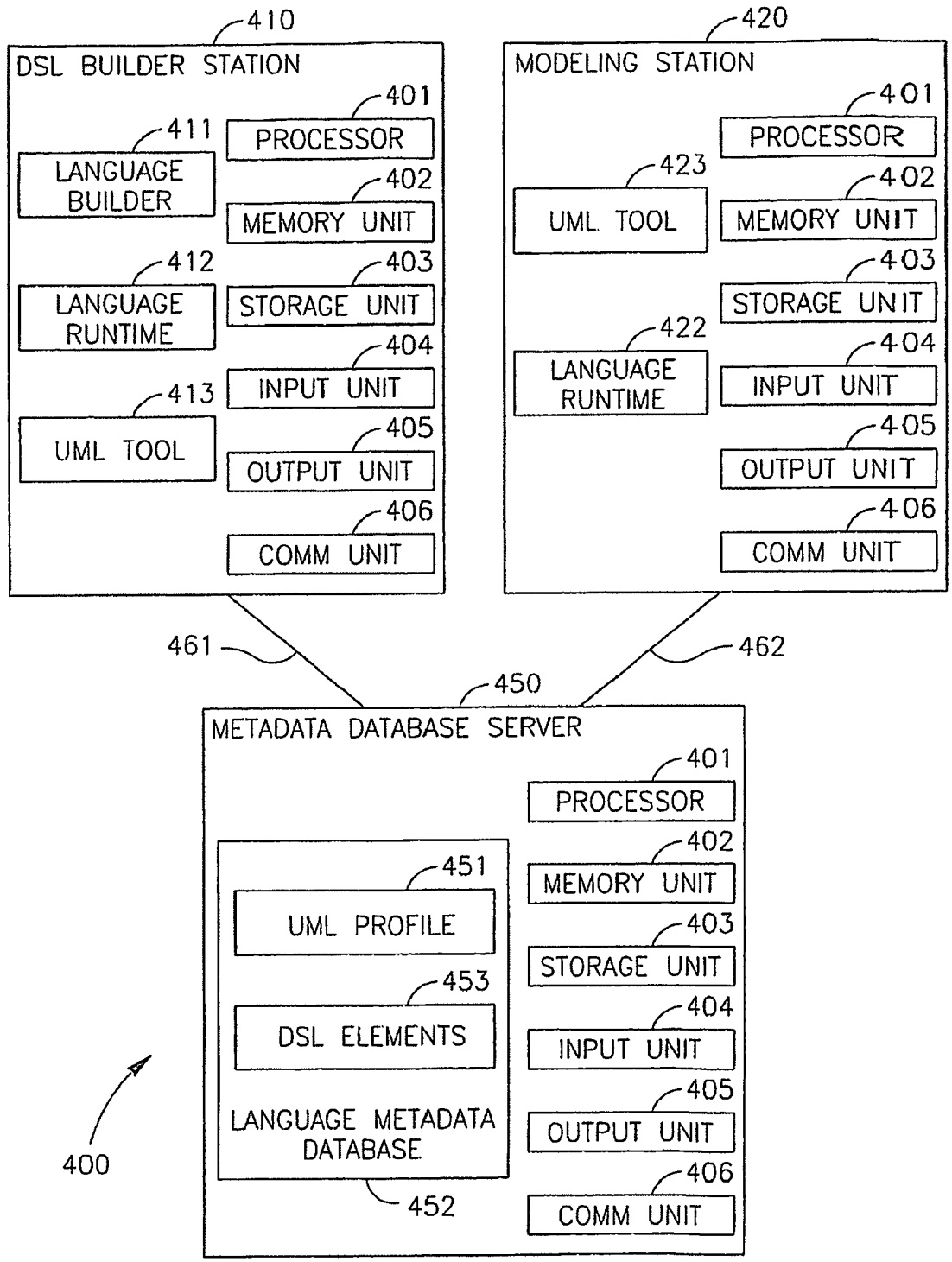
FIG. 4 is a schematic block diagram illustration of a system for accelerated modeling in accordance with another embodiment of the invention.

FIG. 4 schematically illustrates a block diagram of a system 400 for accelerated modeling in accordance with some embodiments of the invention. System 400 may include, for example, a metadata database server 450, a DSL builder station 410, and a modeling station 420. In some embodiments, station 410, station 420 and/or server 450 may be implemented as one computing platform, or as multiple, integrated or separate computing platforms or modules of computing platforms, which may be used in a team working environment and/or a configuration management environment.

In some embodiments, station 410, station 420 and/or database server 450 may include, or may be implemented as, a computing platform, a desktop computer, a mobile computer, a laptop computer, a notebook computer, a Personal Digital Assistant (PDA) device, a tablet computer, a server computer, a workstation, a network, or other suitable computing platform or computing station.

In some embodiments, for example, station 410, station 420 and/or database server 450 may include a processor 401, a memory unit 402, a storage unit 403, one or more input units 404 (e.g., a keyboard, a mouse, or the like), one or more output units 405 (e.g., a monitor, speakers, a printer, a scanner, or the like), a communication unit 406 for communicating with other computer platforms (e.g., a modem, a wireless modem, a Local Area Network (LAN) interface, or the like), an operating system (e.g., Linux or Microsoft® Windows®), and/or other suitable hardware components and/or software components.

The metadata database server 450 may include, for example, a language metadata database 452, e.g., able to store a UML profile 451 and one or more DSL elements 453.

The modeling station 420 may include, for example, a language runtime module 422 and a UML-compliant tool 423 (e.g., IBM Rational eXtensible Development Environment (XDE)). Modeling station 420 may be used, for example, by a modeler and/or an architect, for modeling and to create models and elements of models, which may be transferred to the metadata database server 450 through a wired or wireless link 462.

The DSL builder station 410 may include, for example, a language builder module 411, a language runtime module 412, and a UML-compliant tool. The DSL builder station 410 may be used, for example, by a methodologist, to build domain-specific definitions which may be transferred to the metadata database server 450 through a wired or wireless link 461. In some embodiments, the metadata database server 450 may store artifacts generated from the model based on the DSL definitions.

In accordance with some embodiments of the invention, the language builder module 411 may include, for example, a MDA-compliant meta-modeling tool allowing definition of a DSL, e.g., in the form of UML customization. In one embodiment, UML customization may be "light-weight", for example, using a UML profile which modifies a property of an element, e.g., utilizing tagged values, constraints, stereotypes, or the like. In another embodiment, UML customization may be "heavy-weight", for example, using modification of the UML definition model (e.g., the MOF model which defines UML). In some embodiments, a suitable combination of "light-weight" and "heavy-weight" solution may be used, or a "light-weight" solution may be used as long as it suffices to address requirements.

The language builder module 411 may define languages as UML models (e.g., meta-models), for example, using UML-compliant modeling tools. To support meta-modeling specific functionality, the language builder module 411 may use a specially designed UML meta-modeling profile (e.g., the UML profile 451 stored in database 452 of server 450), which in conjunction with corresponding pre-built constraints, rules, and data types may constitute a meta-modeling language available within language builder station 410.

In some embodiments, the language builder module 411 may treat a DSL as a composite entity, which is able to encapsulate other existing languages, and may apply DSL-definitions on the DSL itself. The full set of language definitions may include, for example, domain data types and terms, their properties and relationships, domain-specific operations, constraints, behavioral patterns, definitions of recommended modeling process, as well as rules for model validation, transformation, querying, etc.

In some embodiments, the language builder module may allow strong properties typing, including extended sets of data types (e.g., enumeration datatypes, pre-built primitive datatypes, user-defined datatypes), values lists (e.g., static lookups), and model elements referencing (e.g., dynamic lookups). The strong typing may be supplemented by modeling time presentation and editing accessories, as well as by semantic properties grouping.

In some embodiments, the language builder station 410 may produce, for example, a domain-specific UML-based language, which encapsulates substantially all the definitions made at the meta-modeling stage to be utilized at modeling time and/or by the generators operated on the model. In some embodiments, these definitions may be used to support domain-specific modeling and for further translation into metadata database definitions.

Figure 5:
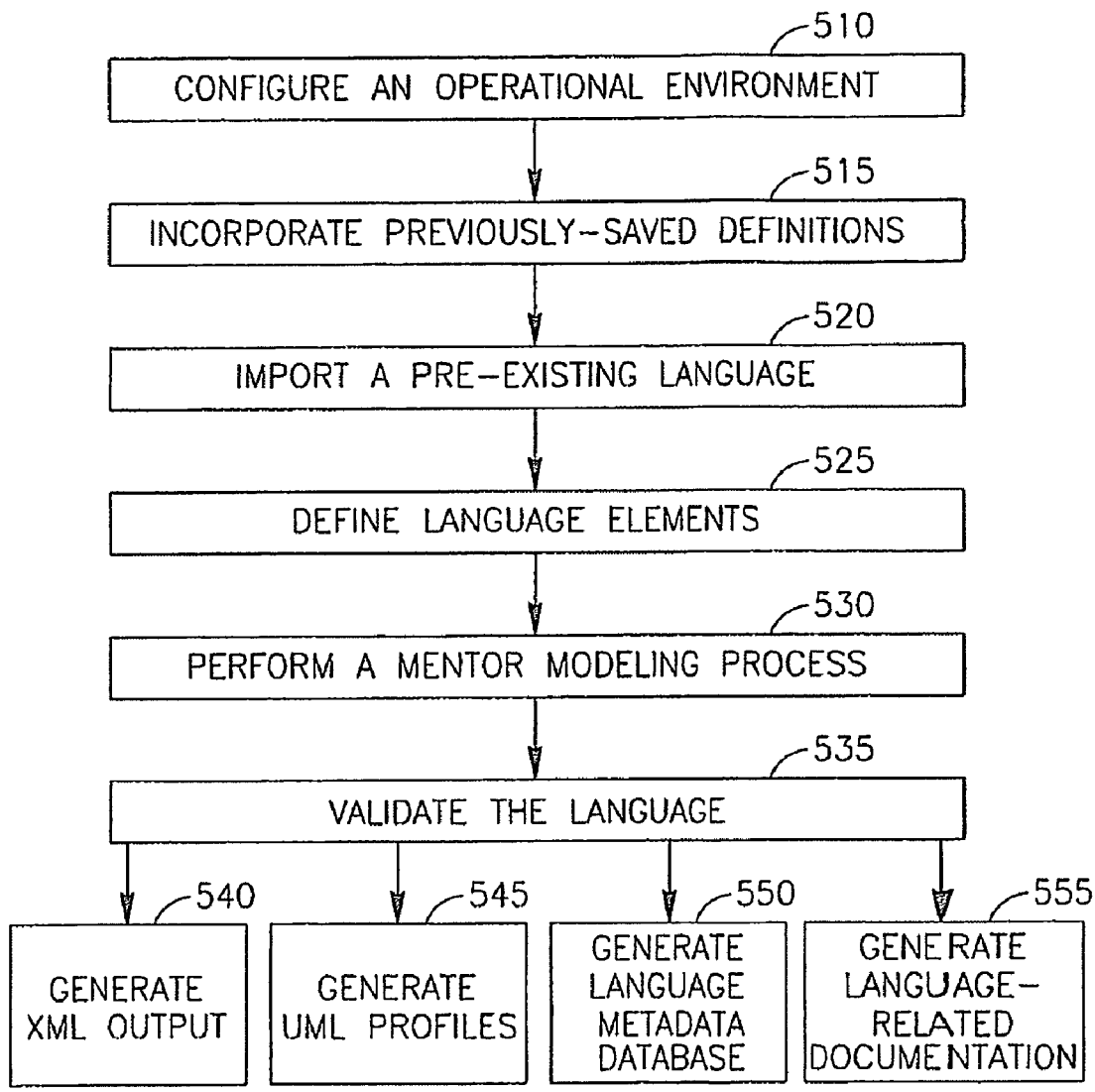
FIG. 5 is a schematic flow-chart of a method of defining a DSL in accordance with some embodiments of the invention.

FIG. 5 is a schematic flow-chart of a method of defining a DSL in accordance with some embodiments of the invention. The method may allow, for example, composition of a DSL from existing language resources (with additional, optional customization), definition of substantially all types of the language elements, and building of output language representations. In some embodiments, the language may include a UML model describing domain terms, their relationships, constraints, permitted operations and recommended flow.

In some embodiments, a language may optionally refer to other languages as language models. Newly created entities may be interlinked (e.g., to override or expand language definitions), for example, with entities that originate imported languages.

In some embodiments, the language may include icons which may be related to terms, e.g., may be part of term properties; the icons may later modify the way in which the UML tool represents the standard UML elements.

In some embodiments, the language definition process may be controlled by a pre-defined meta-modeling language, which may have its own terms (for example, "term", "aspect", "validation rule", "routine", "view", etc.), constraints (for example, "the term may be mapped to one and only one UML-element type", etc.), validation rules (for example, "no isolated terms", "only precise definitions", etc.), recommended flow, etc. In one embodiment, the meta-modeling language may be, for example, pre-defined and incarnated in the meta-modeling process by a pre-built UML profile.

As indicated at box 510, the method may include, for example, configuring an operational environment. This may include, for example, defining of settings, directories, default values, and other objects or parameters, which may be used for model validation and generation of various modeling and runtime artifacts.

As indicated at box 515, the method may optionally include, for example, loading, copying or otherwise incorporating one or more previously-saved definitions of the language under construction.

As indicated at box 520, the method may optionally include, for example, importing one or more pre-existing or pre-defined languages (e.g., custom languages, domain-specific languages, or standard languages). This may include, for example, firstly importing (e.g., importing for the first time) and/or re-importing (e.g., upgrading a language). In some embodiments, an imported language may be represented using an "import" dependency to the imported language inside the new language model.

In some embodiments, the importing may include, for example, searching for available pre-existing languages, presenting to a user a list of available pre-existing languages, selecting (e.g., by a user) one or more languages to import, and importing the selected languages as a foundation for the DSL under construction. For example, in one embodiment, the importing may include an inquiry process to select and adopt pre-existing languages to be imported into a newly-defined language. In some embodiments, one or more pre-defined languages may be provided for integration into a DSL under construction, e.g., to allow additional functionality and behavior, such as Component-Based Development (CBD), Model Driven Testing (MDT), or the like.

In some embodiments, a language imported into a DSL under construction may be subject to customization. In one embodiment, an existing custom language (e.g., a DSL created in accordance with embodiments of the invention) may be composed into a newly created DSL.

In some embodiments, substantially each language may be stored in a principal external format, for example, as an XML file according to pre-defined XML schema. In one embodiment, part of the language definition may allow self-explanation, e.g., to support an inquiry process of determining pre-existing languages for import; for example, the language definition may include indications of the language name, version, author, description, the domain the language belongs to, a list of main terms, or the like.

In some embodiments, importing an existing language resource into the language under construction may include, for example, importing the resource into a newly-created language package. If the resource is already represented in the language under construction, the resource may be re-imported (e.g., updated) into an existing package, optionally with analysis of impacts and updating of dependent definitions.

In some embodiments, importing the resource may include a set of operations, for example, loading definitions of an existing language, and then building a new language package containing substantially all language definitions, or, in the case of re-importing a resource, updating an existing language package with substantially all the contained language definitions, checking the impact of the language package on the rest of the language definition, and optionally updating dependent language definitions.

In some embodiments, importing the resource may include an inquiry process to select and adopt pre-existing languages from which resources may be imported into the newly-created language. The inquiry process may include, for example, browsing of available language resources, viewing of the resource information, and selecting the resource to be imported into the newly-created language. In some embodiments, the inquiry process may include a set of operations, for example, presenting one or more available language resource for browsing, selecting an available language resource, optionally presenting a detailed view of the selected resource (e.g., presenting language information of the selected resource), optionally obtaining a user's confirmation for the importing action, and adding the selected resource to a composition list.

As indicated at box 525, the method may include, for example, defining language elements. This may include, for example, one or more operations or repeatable operations of defining data types and enumerations, defining language terms, mapping of language terms to UML elements, defining relationships, defining constraints, defining rules, defining actions, defining recommended process flow, defining icons to represent terms at modeling time, defining aspects, and defining language-level information.

As indicated at box 530, the method may optionally include, for example, performing a customized mentor modeling process. In some embodiments, the language under construction may optionally include a process flow definition, which may describe main modeling activities and corresponding objects of the language terms (e.g., modeling artifacts). Such definition may be performed, for example, in relation to a standard activity diagram, which may optionally include embedded sub-diagrams and associated objects. To achieve a desired level of precision, special stereotypes for activities, objects and transitions may be defined and/or used, thereby providing additional fields or properties such as, for example, mandatory requirements, comments, links to particular help topics, or the like. In some embodiments, such definitions may allow customized process of mentoring, for example, using step-by-step wizards, next-step prompts (e.g., representing an implementation of a pre-defined modeling workflow), estimation of modeling progress, working point sensitive help, or the like. Reflecting these definitions, the mentoring process may guide the modeling process in substantially all its phases and activities, e.g. in accordance with a pre-defined development standard or a modified development standard. It is noted that in some embodiments, a language builder itself may operate based on language definitions of a pre-defined "language definition" language, and therefore the language builder may benefit from inherent capabilities and types of support, including, for example, meta-modeling time mentoring. In one embodiment, a mentoring process of language building may affect substantially all activities involved in the language building process.

As indicated at box 535, the method may include, for example, validating the customized language under construction. This may include, for example, checking language definitions to ensure well-formedness, completeness, inter-linkage, consistency, or the like. In one embodiment, well-formedness rules, for example, may be defined as declarative entities inside a pre-defined meta-modeling language.

As indicated at box 540, the method may include, for example, generating XML output representing the language definitions. For example, an output file may be created and stored, having language definitions in the principal external format, for example, an XML file according to standard XML scheme (e.g., XMI) or a specially-designed XML scheme (e.g., a "DSL builder XML scheme"). The XML file may include all language definitions, and may serve as the main language exchange unit, for example, to enable language-based modeling, to allow composing of the language into newly-created languages, to load language definitions into a MOF-compliant repository, or the like.

As indicated at box 545, the method may include, for example, generating UML profiles by creating installation scripts of UML profiles for one or more selected target modeling tools (e.g., IBM Rational Rose modeling tool, IBM Rational XDE modeling tool, or the like). The language may be translated or converted into one or more UML profiles. In some embodiments, profile information may not necessarily include full language definitions, but rather may represent, for example, a subset of language definitions which may be recognized (e.g., directly) by the target modeling tool; the rest of the language definitions, recognizable by the language runtime module, may originate, for example, from the language definition XML file.

As indicated at box 550, the method may include, for example, generating a language metadata database by creating initial scripts, or optionally modifying existing scripts, for database structures of a MOF-compliant language repository. This may allow meta structures of the language to be transformed into repository structures. In one embodiment, populating of the database by language definition entities may be performed, for example, by loading of the language XML file into prepared database tables.

As indicated at box 555, the method may include, for example, generating language-related specification and/or documentation. This may be performed, for example, utilizing one or more suitable standards or tools, e.g., Human-Usable Textual Notation (HUTN) or Reusable Asset Specification (RAS).

Other suitable operations or sets of operations may be used in accordance with embodiments of the invention.

Figure 6:
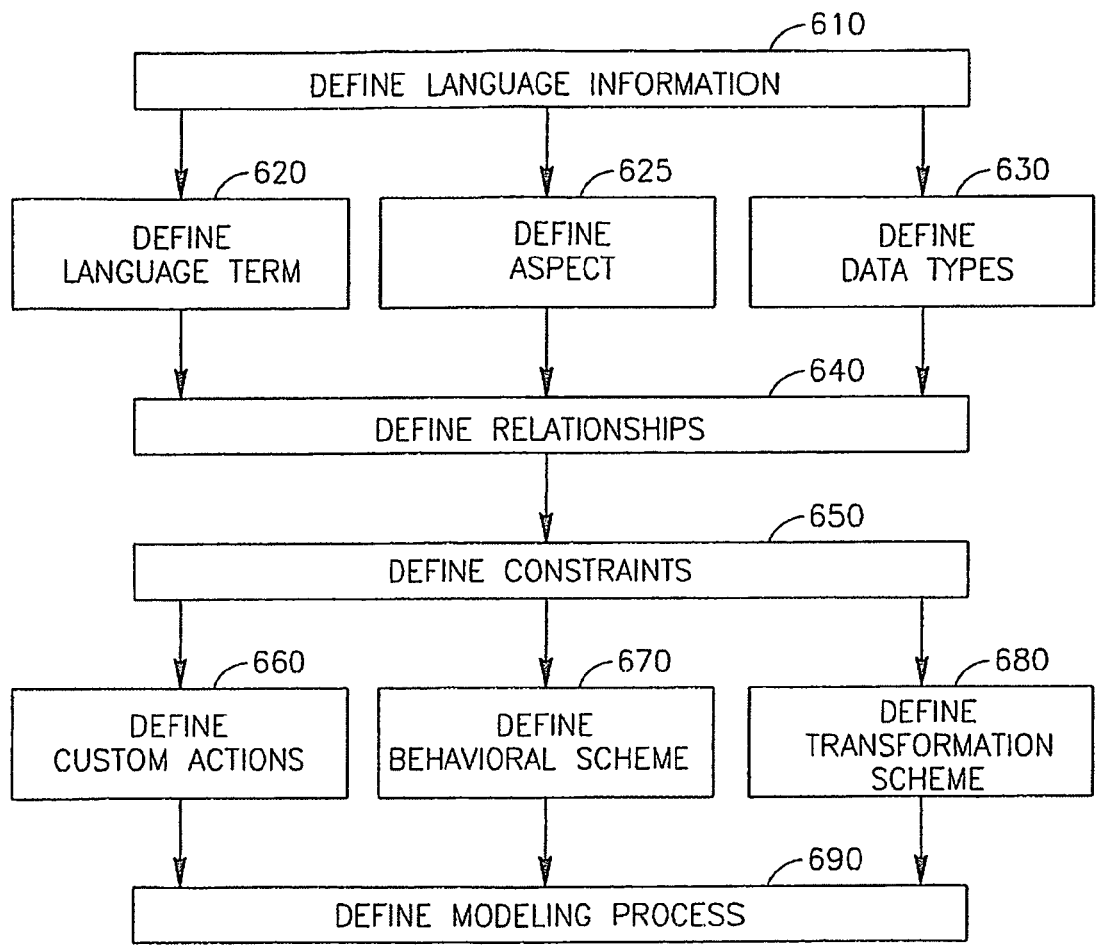
FIG. 6 is a schematic flow-chart of a method of defining a DSL element in accordance with some embodiments of the invention.

FIG. 6 is a schematic flow-chart of a method of defining a DSL element in accordance with some embodiments of the invention. The method may allow definition of DSL elements, for example, information, data type, term, aspect, relationship, constraint, action, or the like, as well as refinement of imported language resources and their linking with newly-created entities. In some embodiments, the method of FIG. 6 may be an example of the operations indicated at box 525 of FIG. 5.

As indicated at box 610, the method may include, for example, defining language information. This may include, for example, filling pre-defined language information data-items, for example, Globally Unique Identifier (GUID), description, version, author, copyright, or the like. The language information may allow, for example, languages inquiry and/or composing.

As indicated at box 620, the method may include, for example, defining language term, e.g., a main language entity reflecting a domain-specific semantic unit ("atom"). Language term definition may include, for example, defining a name, mapping to a UML meta-class (e.g., UML element type), and defining a set of custom properties. A term may inherit from other terms and may contain aspects. Terms, as defined in a language, may constitute the main building blocks at modeling time. In one embodiment, one or more aspects (e.g., containers of structural and/or behavioral features) may be defined and/or may be aggregated into one or more terms; an aspect may inherit from one or more other aspects.

As indicated at box 625, the method may include, for example, defining aspects able to affect a language term, a property of a language term, a relationship between two or more language terms, or the like.

As indicated at box 630, the method may include, for example, defining data types, e.g., language-specific data types. The data types may include, for example, primitive or composite data types, enumerations, or references. The data types may be used in definitions of language terms and their properties. Composite (e.g., user defined) data types may include other composite data types, primitive types and enumerations. Composite data types and enumerations may inherit from other composite data types and enumerations, respectively.

As indicated at box 635, the method may include, for example, defining aspects, e.g. containers of structural and behavioral features, which may be aggregated into terms. An aspect may inherit from one or more other aspects.

As indicated at box 640, the method may include, for example, defining relationships, e.g., a relationship between two language terms or among a plurality of language terms. Relationship definition may include, for example, defining a name, mapping to a UML mechanism (e.g., association, aggregation, composition, dependency), and setting defaults for standard properties and a set of extended properties. Relationships and corresponding terms, as defined in a language, may constitute the main building blocks at modeling time and/or generation time.

As indicated at box 650, the method may include, for example, defining constraints, e.g., for one or more types (or all types) of a language entity. Constraint definition may be based on OCL notation (e.g., standard constraint) having three layers, for example, pre-condition, post-condition, and invariant. The defined constraint may include, for example, elementary constraints (e.g., related to a particular language element) and/or composite constraints (e.g., defining validity of a language subset). At modeling time, the defined constraints may constitute a base for model validation, may be used as validation rules, and/or may be part of the mentoring process.

As indicated at box 660, the method may include, for example, defining custom actions which may be executed (or may be available for execution) on language terms and relationships. Such actions may include, for example, queries, link referencing, automatic diagram building, customized CRUDL operations, or the like. The custom actions may be available for generators while browsing the DSL-based model for generation of various artifacts. The definition of custom actions may, for example, allow invocation of custom domain-specific functionality at modeling and/or generation time.

As indicated at box 670, the method may include, for example, defining a behavioral scheme, e.g., allowing domain-specific estimations, merging of models, and/or impact analysis at modeling and/or generation time.

As indicated at box 680, the method may include, for example, defining a transformation scheme, e.g., allowing extension or expansion of existing model entities by additional properties, and creation of new model entities corresponding to existing entities. These definitions may, for example, enable automatic model transformations at modeling and/or generation time.

As indicated at box 690, the method may include, for example, defining a modeling process, e.g., a recommended modeling process which may answer organization needs or objectives. These definitions may include, for example, a modeling process, modeling activities, modeling transitions, modeling artifacts, progress criteria, process-sensitive help items and wizards, or the like. In conjunction with constraints, these definitions may constitute a basis for automatic process mentoring at modeling and/or generation time.

Other suitable operations or sets of operations may be used in accordance with embodiments of the invention.

Figure 7:
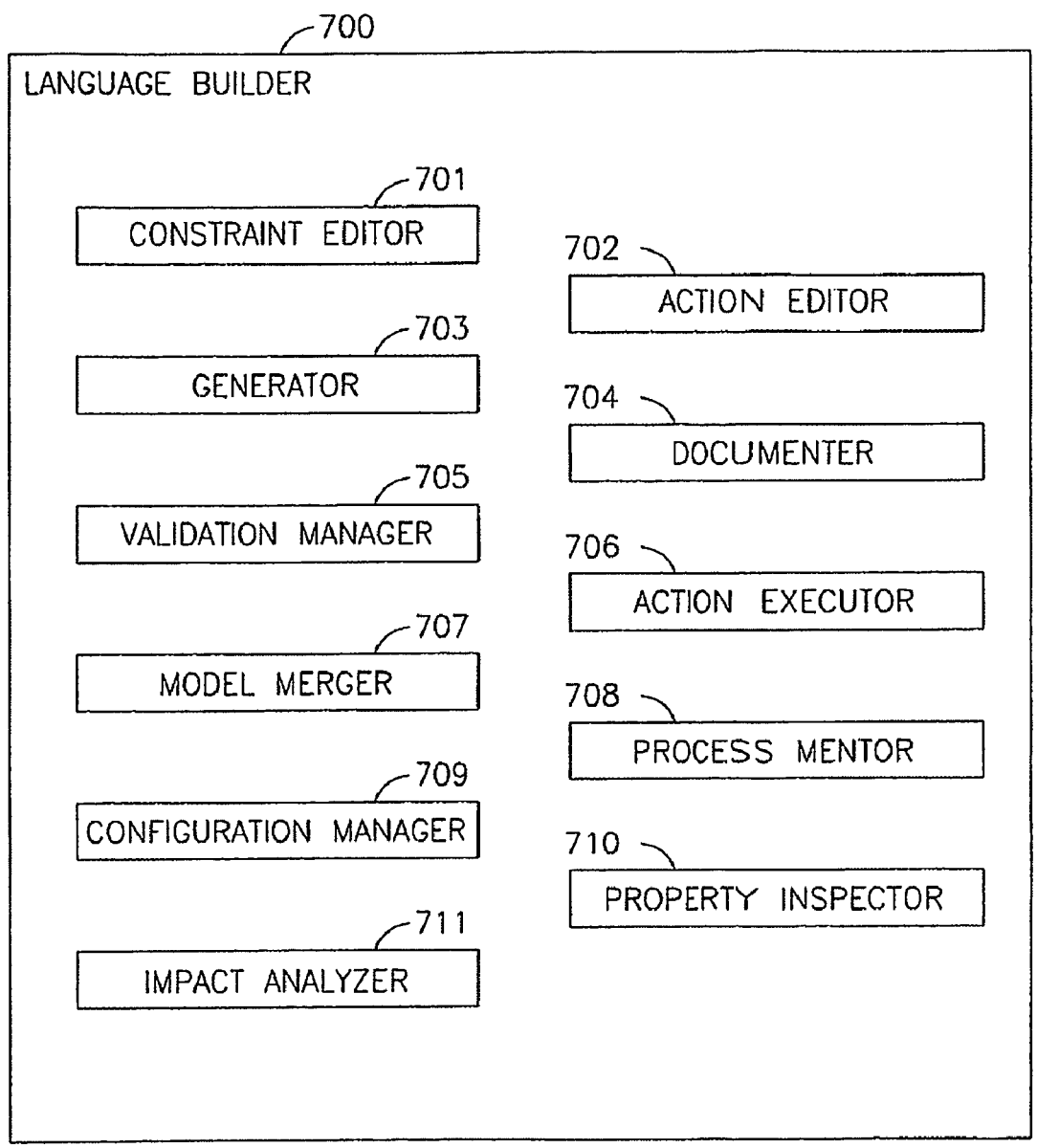
FIG. 7 is a schematic block diagram illustration of a language builder component of a modeling system in accordance with some embodiments of the invention.

FIG. 7 is a schematic block diagram illustration of a language builder component 700 of a modeling system in accordance with some embodiments of the invention. Language builder 700 may be an exemplary implementation of language builder 210 of FIG. 2. Language builder 700 may include one or more modules, software components, and/or hardware components, for example: a constraint editor 701 able to allow editing of DSL constraints; an action editor 702 able to allow editing of DSL actions, as well as supporting on-the-fly definition of actions based on terms of a pre-built meta-modeling language; a generator 703 able to transform language definitions into output artifacts (e.g., a language definitions XML file, language UML profiles, and DDL scripts for a metadata database); a documenter 704 able to generate DSL documentation, e.g., based on terms of a pre-built Meta Modeling Language and/or using pre-built documentation templates; a validation manager 705 able to utilize constraints information (e.g., as defined in a pre-built meta-modeling language) to ensure consistency and precision of the DSL under construction; an action executor 706 able to perform actions as defined in a pre-built meta-modeling language or constructed on-the-fly within the selected meta-model scope; a model merger 707 to perform migration of language definitions and/or language-based models, e.g., if changed versions of embedded sub-languages are re-imported; a process mentor 708 able to ensure that a recommended meta-modeling process is executed (e.g., as defined in a pre-built meta-modeling language); a configuration manager 709 to enable language definitions and configuration information which may be used to support the DSL building process; a property inspector 710 to allow viewing and editing of extended properties of language elements (e.g., as defined in a pre-built meta-modeling language); and/or an impact analyzer 711 to perform analysis of impacts, for example, if one or more parts of language definitions are modified, or when embedded languages are re-imported, using an impact analysis scheme (e.g., included in a pre-built meta-modeling language).

Figure 8:
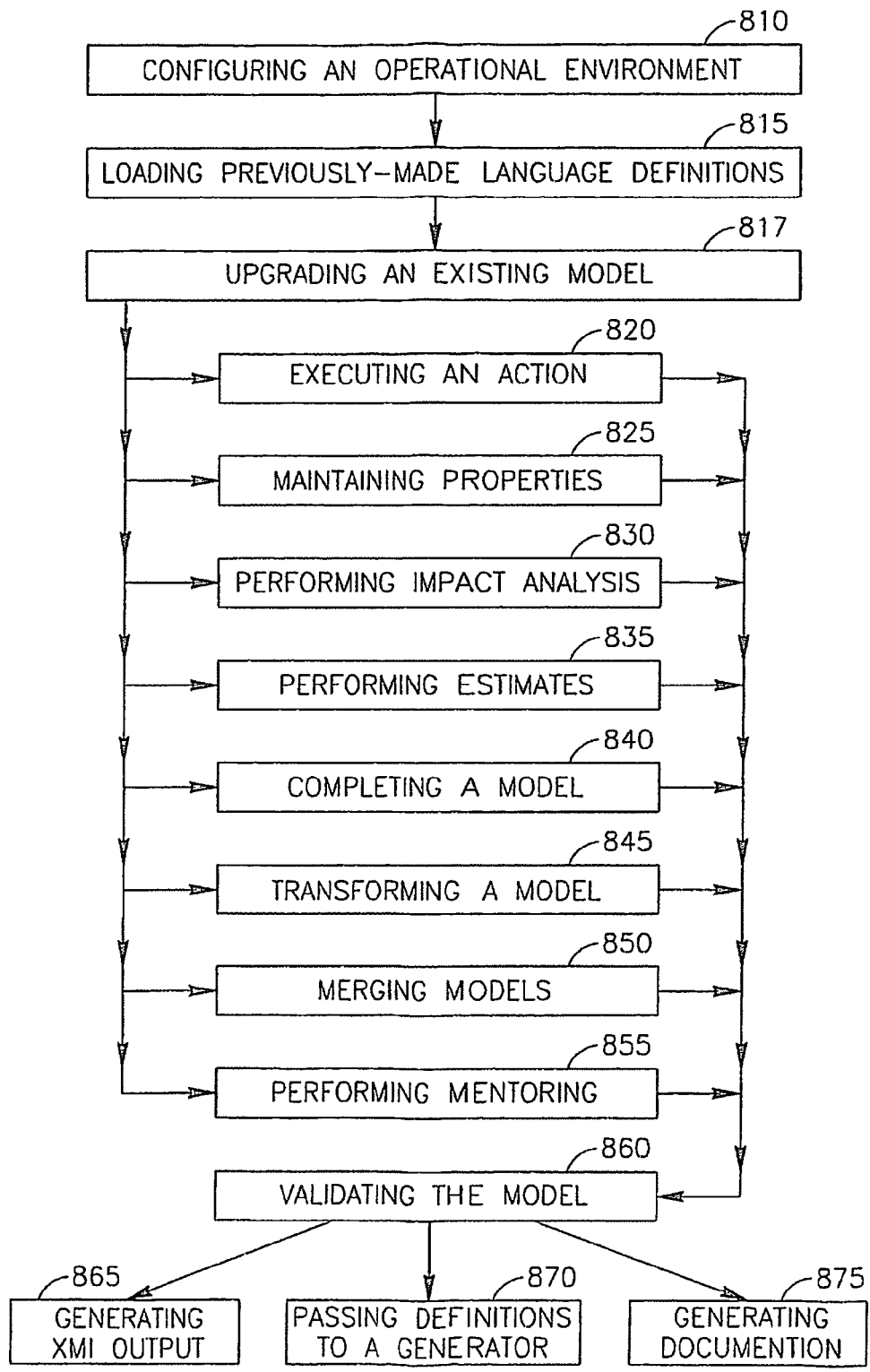
FIG. 8 is a schematic flow-chart of a method of modeling in accordance with some embodiments of the invention.

FIG. 8 is a schematic flow-chart of a method of modeling in accordance with some embodiments of the invention. The method may be performed or implemented by, for example, language runtime module 220 of FIG. 2, or by other suitable language runtime component.

In some embodiments, the method may be used to support a modeling process (e.g., on top of organization language definitions), which may include, for example, establishment of operational environment, maintenance of extended properties, execution of actions, impact analysis, estimations, transformations, merges, validations, version control, model upgrades (e.g., if an underlying language was modified), and generation of documentation, XML files, XMI files, and model-driven artifacts.

As indicated at box 810, the method may include, for example, configuring an operational environment. This may result in, for example, definitions of settings, directories, defaults, or the like.

As indicated at box 815, the method may include, for example, loading previously-made language definitions from a persistent storage. A primary storage may include, for example, a language XML file, and in some embodiments it may include MOF-compliant repository for language definitions.

As indicated at box 817, the method may optionally include, for example, upgrading an existing model to reflect changes made in language definitions. This may be performed, for example, if it is determined that the language version was modified.

As indicated at box 820, the method may include, for example, executing an action. This may include, for example, executing an action, defined in the DSL definition phase, at modeling time. The execution may allow, for example, performing customized CRUDL operations, querying a model and obtaining online reports, building diagrams, creating views as pre-defined UML diagrams, or the like.

As indicated at box 825, the method may include, for example, maintaining properties. This may allow viewing and editing of extended model properties (e.g., as defined in the DSL) including, for example, strong properties typing, logical grouping, look-ups, or the like.

As indicated at box 830, the method may include, for example, performing impact analysis. This may include invocation of impact analysis procedures (e.g., as defined in the DSL) to obtain corresponding online reports.

As indicated at box 835, the method may include, for example, performing estimates (e.g., costs estimates and/or resources estimates). This may include invocation of estimation procedures, (e.g., as defined in the DSL) to obtain corresponding online reports.

As indicated at box 840, the method may include, for example, completing a model, e.g., by expanding an existing model using expansion templates and defaults defined as part of the DSL.

As indicated at box 845, the method may include, for example, transforming a model, e.g., performing model-to-model transformations as defined in the DSL.

As indicated at box 850, the method may include, for example, merging models, e.g., based on one or more merging schemas defined in the DSL As indicated at box 855, the method may include, for example, performing customized modeling process mentoring, e.g., using step-by-step wizards, next-step prompts, estimation of modeling progress, working point sensitive helps, or the like. The mentoring may affect or may be associated with, for example, substantially all activities involved in the modeling process.

As indicated at box 860, the method may include, for example, validating the model, e.g., by checking the model to ensure its well-formedness and correspondence to language definitions. The validation rules may be defined as constraints inside the DSL.

As indicated at box 865, the method may include, for example, generating XMI output, e.g., by saving the model as an XMI file extended with language-related properties.

As indicated at box 870, the method may include, for example, passing definitions to a generator able to generate tangible artifacts (e.g., scripts, codes, help files, or the like) from the model.

As indicated at box 875, the method may include, for example, generating language-related specification or documentation. This may be performed, for example, utilizing one or more suitable standards or tools, e.g., HUTN or RAS.

Other suitable operations or sets of operations may be used in accordance with embodiments of the invention.

Figure 9:
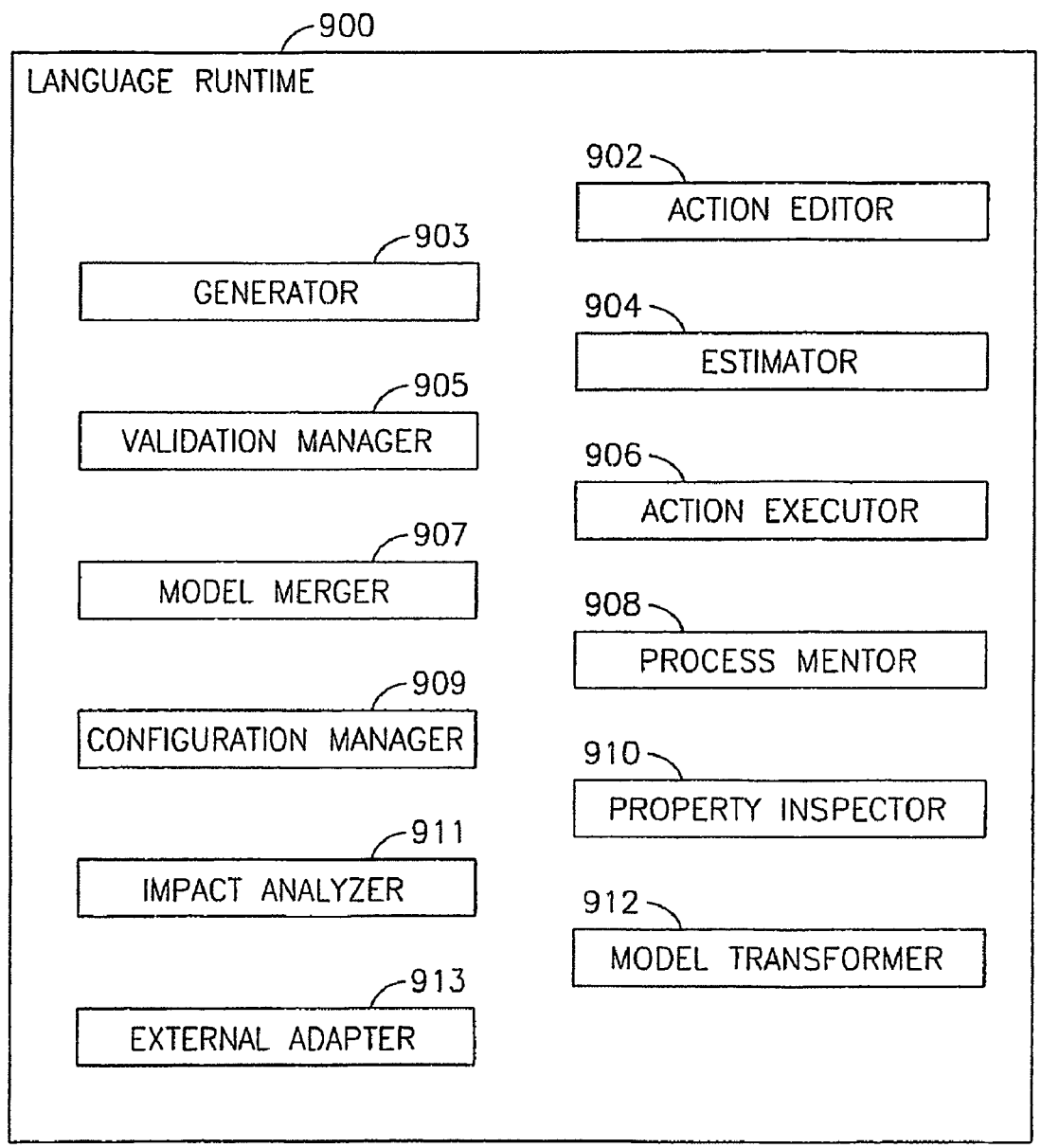
FIG. 9 is a schematic block diagram illustration of a language run-time component of a modeling system in accordance with some embodiments of the invention.

FIG. 9 is a schematic block diagram illustration of a language runtime component 900 of a modeling system in accordance with some embodiments of the invention. Language runtime 900 may be an exemplary implementation of language runtime 220 of FIG. 2. Language runtime 900 may include one or more modules, software components, and/or hardware components, for example: an action editor 902 to allow on-the-fly definition of custom actions based on DSL terms; a generator 903 able to export domain-specific models, e.g., in XMI format; an estimator to perform model-driven estimations of costs, resources, and/or risks; a validation manager 905 able to utilize constraints information (e.g., as defined in the DSL) to ensure model consistency and precision, e.g., by validating a model or a selected portion of the model, and by reporting the detected inconsistencies; an action executor 906 to perform actions as defined in the DSL or constructed on-the-fly within the selected model scope; a model merger 907 to merge domain-specific models, and/or to perform migration or upgrades (e.g., if the underlying DSL was modified); a process mentor 908 to ensure that a recommended modeling process is executed (e.g., as defined in the DSL), the process including, for example, checking model status, detecting conflicts, providing warning messages about detected conflicts, suggesting activities to be performed, estimating percentage of tasks executed, estimating progress, or the like; a configuration manager 909 to provide language definitions and configuration information which may be used to support domain-specific modeling; a property inspector 910 to allow viewing and editing of extended properties (e.g., as defined in the DSL), for example, logical grouping of properties, strong type support, various lookups, presentation and editing controls, just-in-time validations, or the like; an impact analyzer 911 to perform an automatic analysis of impacts, and to report impacts (e.g., in accordance with a sub-language designed for impact analysis purposes); a model transformer 912 to perform model expansions and transformations, in accordance with one or more transformation schemas defined in the DSL); and/or an external adapter to allow integration with a third-party MDA generator or other tools.

Figure 10:
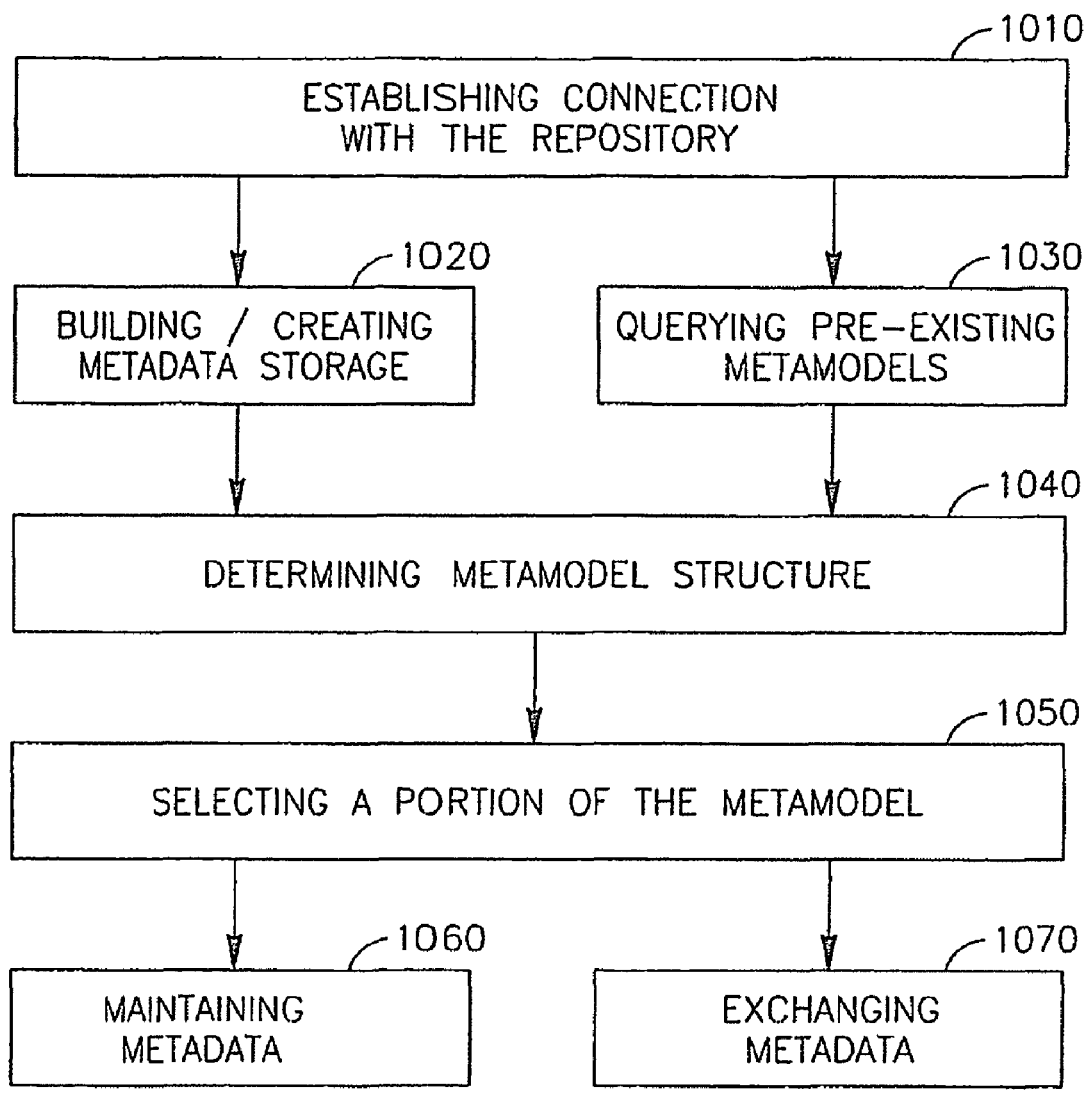
FIG. 10 is a schematic flow-chart of a method of accessing meta-definitions in accordance with some embodiments of the invention.

FIG. 10 is a schematic flow-chart of a method of accessing meta definitions in accordance with some embodiments of the invention. The method may be performed or implemented by, for example, the language metadata database 230 of FIG. 2, or by other suitable language metadata database components.

In some embodiments, the method may be used to access metadata stored in a repository. The access may include, for example, establishment of connection, inquiry of metadata, discovery of metadata structure, selection of metadata, CRUDL operations on metadata entities, metadata transformations, XMI exchange operations, or the like.

As indicated at box 1010, the method may include, for example, establishing connection with the repository.

As indicated at box 1020, the method may optionally include, for example, building or creating metadata storage which may include, for example, meta definitions, mapping to relational structures, and population of metadata.

As indicated at box 1030, the method may optionally include, for example, querying one or more existing meta-models which may pre-exist in the repository. This may be performed, for example, in response to a determination that such one or more meta-models pre-exist in the repository.

As indicated at box 1040, the method may include, for example, determining metamodel structure, e.g., using MOF-reflective interfaces. MOF reflective interfaces may provide step-by-step exploring of a metadata repository without a-priory knowledge about stored metadata structures. For example, substantially each element, stored in the repository, may implement a generic, pre-defined set of self-exploring operations, allowing to obtain information about the element's type (e.g., an operation on the element), to discover a set of properties associated with this type (e.g., an operation on the element representing a corresponding type), to obtain actual values of these properties of that element, or the like.

As indicated at box 1050, the method may optionally include, for example, selecting a portion or a section of the model, e.g., a meta-model and/or an application model.

As indicated at box 1060, the method may include, for example, maintaining metadata, e.g., by performing CRUDL operations on meta-model entities.

As indicated at box 1070, the method may include, for example, exchanging metadata, e.g., by performing XMI-related import and/or export operations on metadata or otherwise parsing XML.

Other suitable operations or sets of operations may be used in accordance with embodiments of the invention.

Some embodiments may provide, for example, a method of defining a DSL having both static and dynamic elements; the dynamic elements may include, for example, actions and processes In some embodiments, UML may be used to define a full scope of a DSL, covering both static and dynamic aspects. This may allow covering all required definitions, by reusing UML semantics, UML skills, and UML tools.

In some embodiments, the language definitions may themselves be a UML model, and the DSL construction process is a model-driven process. A semantically rich model of the DSL may be created, covering all language aspects. Then, a user may invoke generation of appropriate artifacts (e.g., UML profiles) required for passing all language definitions to the modeling tool and to make them available to a modeler at modeling time. This may directly implement a MDA approach, in which models (e.g., language models) drive development (e.g., creation of UML profiles, etc).

In some embodiment, UML-related skills and tools may be used or reused for meta-modeling purposes. For example, a term may be represented as a UML class and may thus be able to contain properties represented as UML attributes, and semantics of relationships between a class and its attributes may be provided by UML. A term may contain, for example, two UML artifacts defining a concrete syntax (e.g., icons in Explorer view and in diagrams), and semantics of ownership may be provided by UML. Value lists may be represented as UML enumerations, and semantics of enumeration definition and usage may be provided by UML. A term may have one or more states, a state may have a corresponding graphical representation or icon, and this may be expressed using UML state charts. Views (e.g., basic action units) may be represented as derived UML classes, using derivation rules represented as constraints, and possible parameterization may be expressed by UML templates (e.g., parameterized classes). An action may combine views using UML activity graphs, including activities, decisions, transitions, or the like; these constructs may be provided by UML. One or more modeling processes (e.g., recommended flows) may be expressed using UML use case diagrams, such that substantially each use case may be detailed by a corresponding activity graph. Other suitable elements (e.g., classes, constraints, etc.) may be used to define a UML customization (e.g., a new DSL on top of UML) using UML and UML-related semantics (e.g., well known semantics, documented semantics, and commonly understandable semantics). This may allow using UML tools for meta-modeling purposes (e.g., defining a language), in association with a pre-built meta-modeling profile (language) containing meta-modeling terms, properties, actions, or the like, thereby facilitating the meta-modeling process.

Some embodiments of the invention may be implemented by software, by hardware, or by any combination of software and/or hardware as may be suitable for specific applications or in accordance with specific design requirements.

Embodiments of the invention may include units and/or sub-units, which may be separate of each other or combined together, in whole or in part, and may be implemented using specific, multi-purpose or general processors or controllers, or devices as are known in the art.

Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by computing station or a processor, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, C#, a JAVA™ programming language, BASIC, Visual BASIC, Visual C++, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:
   defining, by a language builder module executed by a processor of a language builder station, a domain-specific language usable in defining a modeling environment and having a dynamic component and a static component, wherein behavior definitions of said static component are modifiable by said dynamic component; and
   applying on a modeling environment, by a language runtime module executed by a processor of a modeling station, modification by said dynamic component of behavior definitions of said static component, so as to change definitions of modeling process, wherein said dynamic component is a domain-specific language definition applied on said static component; and the domain-specific language definition is built via a DSL builder station.

2. The method of claim 1, wherein defining said domain-specific language comprises:
   defining said dynamic component and said static component in accordance with Unified Modeling Language constructs and semantics.

3. The method of claim 1, wherein defining said domain-specific language comprises:
   defining a customized Unified Modeling Language meta-modeling profile which supports definitions of said dynamic component and said static component.

4. The method of claim 1, wherein defining said domain-specific language comprises:
   defining said domain-specific language based on custom meta-modeling constructs, said constructs in accordance with a Unified Modeling Language meta-modeling profile and defining said dynamic component and said static component.

5. The method of claim 1, wherein defining said domain-specific language comprises:
   importing a definition of an element of said domain-specific language from a previously-defined domain-specific language.

6. The method of claim 1, wherein defining said domain-specific language comprises:
   validating said domain-specific language in accordance with a validation rule defined in a meta-modeling language.

7. The method of claim 1, wherein defining said domain-specific language comprises:
   generating an eXtensible Markup Language output representing at least one definition of said domain-specific language.

8. The method of claim 1, wherein defining said domain-specific language comprises:
   defining a custom action available for execution, on an element of an application model compliant with said domain-specific language, in response to an invocation request in accordance with said domain-specific language.

9. The method of claim 1, wherein defining said domain-specific language comprises:
   defining at least one language information item of said domain-specific language;
   defining at least one language term of said domain-specific language; and
   defining at least one data type of said domain-specific language.

10. The method of claim 9, wherein defining said domain-specific language further comprises:
    defining a relationship between said at least one language term and another language term of said domain-specific language.

11. The method of claim 9, wherein defining said domain-specific language further comprises:
    defining a constraint associated with one or more elements of said domain-specific language to be used during validation of said one or more elements of said domain-specific language.

12. The method of claim 9, wherein defining said domain-specific language further comprises:
    defining an aspect able to affect an element selected from a group consisting of: said at least one language term, a property of said at least one language term, and a relationship between said at least one language term and another language term.

13. The method of claim 1, further comprising:
    applying said domain-specific language to said model during execution of a modeling process of said model.

14. The method of claim 13, further comprising:
    creating one or more elements of a model in accordance with at least one language term defined in said domain-specific language.

15. The method of claim 14, wherein creating comprises:
generating a recommended modeling process to be used during creation of said one or more elements of said model in accordance with a mentor modeling definition of said domain-specific language wherein the modeling definition may include at least one of a list consisting of: modeling process, modeling activities, modeling transitions, modeling artifacts, progress criteria, process-sensitive help items, step-by-step wizards, next activity prompts, estimation of modeling progress, working point sensitive helps, checking model status, detecting conflicts, providing warning message about detected conflicts, suggesting activities to be performed, estimating percentage of tasks executed, phase-sensitive helps and methodology guiding.

16. The method of claim 14, wherein creating comprises:
executing a custom action defined in said domain-specific language on at least one of said one or more elements of said model.

17. The method of claim 14, wherein creating comprises:
converting a domain-specific model artifact of said domain-specific language into an application artifact usable during execution of said modeling process.

18. The method of claim 17, further comprising:
storing said domain-specific model artifact in a metadata database able to provide access to said domain-specific model artifact.

19. A system for accelerated modeling, the system comprising:
a language builder station running on a processor for executing a language builder module to define a domain-specific language usable in defining a modeling environment and having a dynamic component and a static component, wherein behavior definitions of said static component are modifiable by said dynamic component said dynamic component; and
a modeling station running on a processor for executing a language runtime module to apply on a modeling environment modification by said dynamic component of behavior definitions of said static component so as to change definitions of modeling process, wherein said dynamic components is a domain-specific language definition applied on said static component, wherein said dynamic component is a domain-specific language definition applied on said static component; and the domain-specific language definition is built via a DSL builder station.

20. The system of claim 19, wherein said language builder module is able to import a definition of an element of said domain-specific language from a previously-defined domain-specific language.

21. The system of claim 19, wherein said language builder module comprises a validator to validate said domain-specific language in accordance with a validation rule defined in a meta-modeling language.

22. The system of claim 19, wherein said language builder module comprises a generator to generate an eXtensible Markup Language output representing at least one definition of said domain-specific language.

23. The system of claim 19, wherein said language builder module comprises an action editor to define a custom action available for execution on a model in accordance with said domain-specific language in response to an invocation request in accordance with said domain-specific language.

24. The system of claim 19, wherein said language builder module is able to define at least one language information item of said domain-specific language, to define at least one language term of said domain-specific language, and to define at least one data type of said domain-specific language.

25. The system of claim 24, wherein said language builder module is able to define a relationship between said at least one language term and another language term of said domain-specific language.

26. The system of claim 19, wherein said language builder module comprises a constraint editor to define a constraint associated with said data type to be used during validation of one or more elements of said domain-specific language.

27. The system of claim 19, comprising a mentoring module to generate a recommended modeling process available during creation of one or more elements of a model in accordance with a mentor modeling definition of said domain-specific language.

28. The system of claim 19, comprising a generator able to create one or more elements of a model in accordance with a process defined in said domain-specific language.

29. The system of claim 28, comprising a language runtime module to apply said domain-specific language to said model during execution of a runtime process of said model.

30. The system of claim 29, wherein said language runtime module comprises a validator to validate said model based on a validation rule defined in said domain-specific language.

31. The system of claim 29 wherein said language runtime module comprises an action executor to execute a custom action defined in said domain-specific language on at least one of said one or more elements of said model.

32. The system of claim 29, wherein said language runtime module comprises a process mentor module to ensure that a modeling process is executed in accordance with a process definition of said domain-specific language.

33. The system of claim 29, wherein said language runtime module comprises a generator to generate an eXtensible Markup Language output representing said model based on said domain-specific language.

34. The system of claim 29, comprising a converter to convert a domain-specific model artifact based on said domain-specific language into an application artifact usable during execution of said runtime process.

35. The system of claim 34, comprising a database to store said domain-specific model artifact and to provide access to said domain-specific model artifact during execution of said runtime process.

36. A non-transitory machine-readable medium having stored thereon instructions that, when executed by a machine, result in:
defining a domain-specific language usable in defining a modeling environment and having a dynamic component and a static component, wherein behavior definitions of said static component are modifiable by said dynamic component; and
applying on a modeling environment modification by said dynamic component of behavior definitions of said static component so as to change definitions of modeling process, wherein said dynamic component is a domain-specific language definition applied on said static component, wherein said dynamic component is a domain-specific language definition applied on said static component; and the domain-specific language definition is built via a DSL builder station.

37. The machine-readable medium of claim 36, wherein the instructions result in:
defining said dynamic component and said static component in accordance with Unified Modeling Language constructs and semantics.

38. The machine-readable medium of claim 36, wherein the instructions result in:
defining a customized Unified Modeling Language meta-modeling profile which supports definitions of said dynamic component and said static component.

39. The machine-readable medium of claim 36, wherein the instructions result in:
defining said domain-specific language based on custom meta-modeling constructs, said constructs in accordance with a Unified Modeling Language meta-modeling profile and defining said dynamic component and said static component.

* * * * *